US012697267B2

(12) United States Patent
Perez et al.

(10) Patent No.: US 12,697,267 B2
(45) Date of Patent: Aug. 4, 2026

(54) PRONE FACE PILLOW

(71) Applicant: Mizuho Orthopedic Systems, Inc., Union Clty, CA (US)

(72) Inventors: Stacy Diaz Perez, San Jose, CA (US); Stephan Schmid, San Francisco, CA (US); Donald Parker, Union City, CA (US)

(73) Assignee: Mizuho Orthopedic Systems, Inc., Union City, CA (US)

( * ) Notice: Subject to any disclaimer, the term of this patent is extended or adjusted under 35 U.S.C. 154(b) by 20 days.

(21) Appl. No.: 18/918,905

(22) Filed: Oct. 17, 2024

(65) Prior Publication Data

US 2025/0120866 A1 Apr. 17, 2025

Related U.S. Application Data

(60) Provisional application No. 63/544,618, filed on Oct. 17, 2023.

(51) Int. Cl.
*A61G 13/12* (2006.01)

(52) U.S. Cl.
CPC .... *A61G 13/1215* (2013.01); *A61G 2200/325* (2013.01)

(58) Field of Classification Search
CPC ............ A61G 13/121; A61G 2200/325; A61G 13/1215; A61G 7/072; A61G 13/12; A61G 7/1084; A61G 2200/327; A47G 9/1054; A47G 9/10; A47G 9/109; Y10S 5/953
See application file for complete search history.

(56) References Cited

U.S. PATENT DOCUMENTS

| | | | |
|---|---|---|---|
| 4,259,757 | A | 4/1981 | Watson |
| 4,504,050 | A | 3/1985 | Osborne |
| 4,752,064 | A | 6/1988 | Voss |
| 5,666,682 | A | 9/1997 | Bonaddio et al. |

(Continued)

FOREIGN PATENT DOCUMENTS

DE 202011104541 U1 2/2012

OTHER PUBLICATIONS

"Slotted Head Positioner Foam Freestanding" https://mms.mckesson.com/product/1078913/Xodus-Medical-40521 (Accessed Oct. 15, 2024).

(Continued)

*Primary Examiner* — Ophelia A Hawthorne
(74) *Attorney, Agent, or Firm* — Reed Smith LLP; Matthew P. Frederick; Cheryl L. Gastineau

(57) ABSTRACT

In some implementations, a prone face pillow may include a body having a top surface, a bottom surface, a right-side surface, a left-side surface, and an internal cavity being open at the top surface and the bottom surface. In addition, the prone face pillow may include a right-side intubation tube channel having a non-horizontal pathway and a left-side intubation tube channel having a non-horizontal pathway. Moreover, the prone face pillow may a right-side slot and a left-side slot each configured to allow insertion of an intubation tube into the left-side channel. Also, the prone face pillow may include a right-side perforation pattern and a left-side perforation pattern, where the right-side or left-side perforation pattern must be broken prior to insertion of the intubation tube.

20 Claims, 8 Drawing Sheets

(56) References Cited

U.S. PATENT DOCUMENTS

| | | | | |
|---|---|---|---|---|
| 6,427,272 | B1 | 8/2002 | Yacoub | |
| 6,561,194 | B2 | 5/2003 | Michelson | |
| 6,637,058 | B1 | 10/2003 | Lamb | |
| D625,420 | S | 10/2010 | Sharps et al. | |
| 9,138,087 | B2 | 9/2015 | Mobley et al. | |
| 9,308,147 | B2 | 4/2016 | Davis et al. | |
| 9,980,573 | B2 | 5/2018 | Bennetts | |
| 2005/0177946 | A1 | 8/2005 | Riley | |
| 2015/0223622 | A1 * | 8/2015 | Mobley | B32B 7/14 5/636 |
| 2017/0340127 | A1 | 11/2017 | Bennetts | |
| 2023/0122165 | A1 | 4/2023 | Bauman et al. | |

OTHER PUBLICATIONS

"Comfort Foam Slotted Prone Head Positioner—Dual Density Foam Prone Pillow | BDF-30-106-RL" https://www.davidscottco.com/product/comfort-foam-slotted-prone-head-positioner-dual-density-foam-prone-pillow/ (Accessed Oct. 15, 2024).

"Adult Head Positioner—8"x9"x4" Thick (2.5" Thick at Lowest Point)" https://www.universalmedicalinc.com/adult-head-positioner-8-x-9-x-4-thick-2-5-thick-at-lowest-point.html (Accessed Oct. 15, 2024).

"DeRoyal Prone Head Positioners—Head Positioner with Trach Slot, Compressed" https://www.graylinemedical.com/products/deroyal-prone-head-positioners-head-positioner-with-trach-slot-compressed-9-x-8-x-4-m60-028 (Accessed Oct. 15, 2024).

International Search Report and Written Opinion for PCT/US2024/051777, dated Jan. 17, 2025.

* cited by examiner

PRONE FACE PILLOW

CROSS-REFERENCE TO RELATED APPLICATIONS

This application claims the benefit of priority to U.S. Provisional Application No. 63/544,618 filed Oct. 17, 2024, the disclosure of which is hereby incorporated by reference herein in its entirety.

FIELD OF THE INVENTION

The present invention is directed to prone face pillows and modifications for improving usability and patient comfort.

BACKGROUND OF THE INVENTION

Prone face pillows are generally used to support the head and face of a patient during the performance of surgical procedures and/or during hospital stays.

SUMMARY OF THE INVENTION

One or more embodiments may include a prone face pillow having a body with a top surface, a bottom surface, a right-side surface, a left-side surface, and an internal cavity being open at the top surface and the bottom surface. The pillow also having a right-side intubation tube channel with a non-horizontal pathway from the right-side surface to the internal cavity and a left-side intubation tube channel with a non-horizontal pathway from the left-side surface to the internal cavity. The top surface of the pillow may include a compressible material configured to contact a head of a patient and a right-side slot configured to allow insertion of an intubation tube into the right-side channel and a left-side slot configured to allow insertion of an intubation tube into the left-side channel. The right-side channel including a right-side perforation pattern, wherein the right-side perforation pattern must be broken prior to insertion of the intubation tube in the right-side channel from the top surface; and the left-side channel including a left-side perforation pattern, wherein the left-side perforation pattern must be broken prior to insertion of the intubation tube in the left-side channel from the top surface.

A further embodiment may include a prone face pillow having a body with a top surface, a bottom surface, a right-side surface, a left-side surface, and an internal cavity being open at the top surface and the bottom surface. The pillow also having a right-side intubation tube channel with a downward sloping pathway from the right-side surface to the internal cavity and a left-side intubation tube channel with a downward sloping pathway from the left-side surface to the internal cavity. The top surface of the pillow may include a compressible material configured to contact a head of a patient and a right-side slot configured to allow insertion of an intubation tube into the right-side channel and a left-side slot configured to allow insertion of an intubation tube into the left-side channel. The right-side channel including a right-side perforation pattern, wherein the right-side perforation pattern must be broken prior to insertion of the intubation tube in the right-side channel from the top surface; and the left-side channel including a left-side perforation pattern, wherein the left-side perforation pattern must be broken prior to insertion of the intubation tube in the left-side channel from the top surface.

Another embodiment may include a prone face pillow having a first section and a second section coupled together using at least one adhesive to form a body, the body has a top surface, a bottom surface, a right-side surface, a left-side surface, and an internal cavity, wherein the second section with a material having a higher compressive strength than the first section; the first section having an overhang that extends into the internal cavity further than the second section a right-side intubation tube channel comprising an angled pathway having a diameter of about 0.5 inches or less from the right-side surface to the internal cavity; a left-side intubation tube channel comprising an angled pathway having a diameter of about 0.5 inches or less from the left-side surface to the internal cavity. The top surface comprising a compressible material configured to contact a head of a patient and comprising a right-side slot configured to allow insertion of an intubation tube into the right-side channel and a left-side slot configured to allow insertion of an intubation tube into the left-side channel. The right-side channel comprising a right-side perforation pattern, wherein the right-side perforation pattern must be broken prior to insertion of the intubation tube in the right-side channel from the top surface; and the left-side channel comprising a left-side perforation pattern, wherein the left-side perforation pattern must be broken prior to insertion of the intubation tube in the left-side channel from the top of the surface.

Other features, aspects, and embodiments of the present general inventive concept will be apparent from the following detailed description, the drawings, and the appended claim

BRIEF DESCRIPTION OF THE DRAWINGS

The invention can be completely understood in consideration of the following detailed description of various embodiments of the invention in connection with the accompanying drawings, in which.

Figure 1:
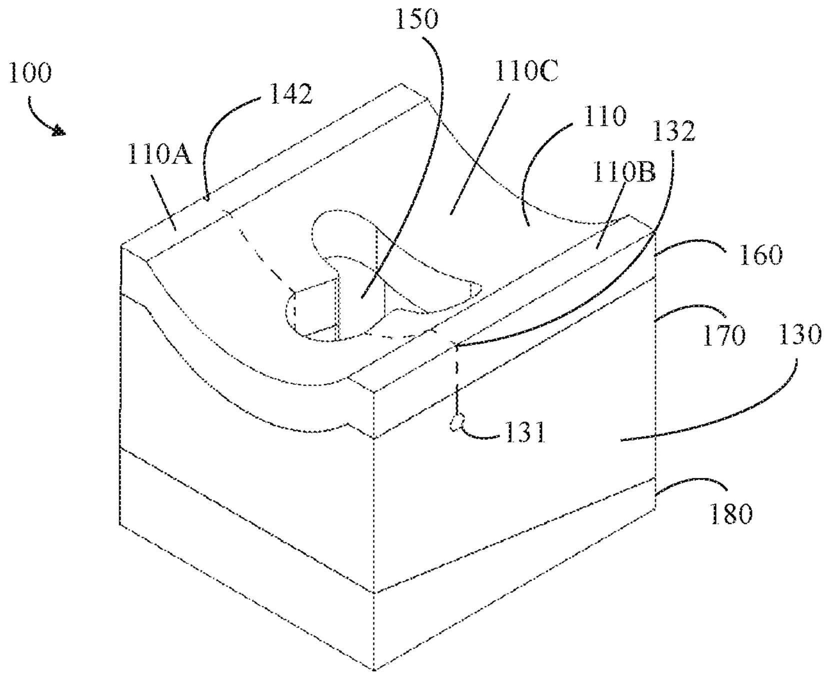
FIG. 1 is a top perspective view of a prone pillow in accord with embodiments of the present disclosure.
Figure 2:
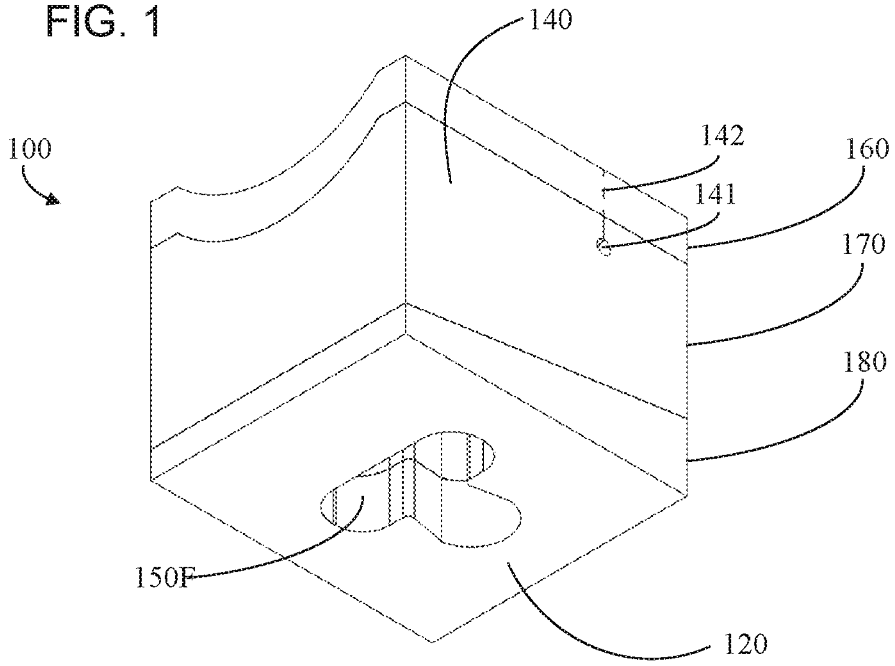
FIG. 2 is a bottom perspective view of a prone pillow in accord with embodiments of the present disclosure.

While the invention is amenable to various modifications and alternative forms, specifics thereof have been depicted by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In the following detailed description of embodiments, reference is made to the accompanying drawings, which form a part hereof and in which are shown, by way of illustration, specific embodiments in which the invention may be practiced. Specific details disclosed herein are in every case a non-limiting embodiment representing concrete ways in which the concepts of the invention may be practiced. This serves to teach one skilled in the art to employ the present invention in virtually any appropriately detailed system, structure or manner consistent with those concepts. It will be seen that various changes and alternatives to the specific described embodiments and the details of those embodiments may be made within the scope of the invention. Because many varying and different embodiments may be made within the scope of the inventive concepts herein described and in the specific embodiments herein detailed without departing from the scope of the present invention, it is to be understood that the details herein are to be interpreted as illustrative and not as limiting.

The various directions such as "upper," "lower," "bottom," "top," "back," "front," "perpendicular", "vertical", "horizontal," "length" and width" and so forth used in the detailed description of embodiments are made only for easier explanation in conjunction with the drawings to express the concepts of the invention. The elements in embodiments may be oriented differently while performing the same function and accomplishing the same result as obtained with the embodiments herein detailed, and such terminologies are not to be understood as limiting the concepts which the embodiments exemplify.

As used herein, the use of the word "a" or "an" when used in conjunction with the term "including" (or the synonymous "may include" or "including") in the claims and/or the specification may mean "one," but it is also consistent with the meaning of "one or more," "at least one," and "one or more than one." In addition, as used herein, the phrase "connected to" means joined to or placed into communication with, either directly or through intermediate components.

Disclosed herein are various embodiments of a prone face pillow designed to accommodate a patient lying in the prone position. As used herein, prone means a patient lying on their abdomen, or face-down.

In some embodiments, and as shown in FIGS. 1-8, a prone face pillow structure may include a body 100. The body 100 may have a top surface 110, a bottom surface 120, a right-side surface 130, a left-side surface 140, and an internal cavity 150. In additional embodiments the body 100 may include or feature a concave geometry on the top surface 110 which may include a concave surface 110 C, as shown, configured to receive, conform to, and/or cradle the head, and specifically the face, of a patient. In certain embodiments, for example as shown FIG. 1, top surface 110 may include a central concave surface 110C extending downwardly from left and right flat edge surfaces 110A, 110B.

The internal cavity 150, may, in various embodiments, take on one or more custom shapes (e.g., round, oval, triangle, rectangle, or any combination or custom shape). By way of non-limiting example, in some embodiments, and as shown, the internal cavity 150 may include a rounded "T" shape (FIG. 5) including a transverse portion 150 A configured to accommodate a patient's eyes and a longitudinal portion 150B extending rearwardly from the center of the transverse portion 150A and configured to accommodate a patient's nose, and mouth, while the top surface 110 supports the surrounding portions of the face, for example the forehead, cheeks, and/or chin. Transverse portion 150A may further include a forward surface 150C which extends transversely to oppositely curved surfaces 150D, 150E at the bilateral sides of transverse portion 150A. In embodiments, the terminal end of longitudinal portion 150B may also be curved. Regardless of the shape design, in some embodiments, and as shown, the internal cavity 150 may pass through the entire body 100 of the prone pillow from the top surface 110 to the bottom surface 120. In other embodiments, internal cavity 150 may not pass through the entire body 100 of the prone pillow, but instead starting at the top surface 110 and stopping at some depth in first section 160 or second section 170. In certain embodiments, the internal cavity 150 has substantially the same profile through the entire body 100 of the prone pillow from the top surface 110 to the bottom surface 120.

In a further embodiment, the body 100 of the prone pillow may include a first section 160 that includes the top surface 110 and a second section 170 that includes the bottom surface 120. In some embodiments, the first section 160 and second section 170 may include a block of resilient material. By way of non-limiting example, the resilient material may include an open cell, die-cut, polymeric material such as polyurethane, polyethylene, and the like. In one embodiment, the resilient material may include an open-cell polymeric foam. In another embodiment, the resilient material may include an open-cell polyurethane foam. In further embodiments, the resilient material may be made with a blowing agent of acetone and water, or carbon dioxide and water. In still further embodiment, the resilient material may be phthalate-free, or substantially phthalate-free.

In certain embodiments, the first section 160 may include an open-cell polyurethane foam including a density of about 1.4 lbs/ft$^3$ (as tested by ASTM D-3574 (A)), and a range of about 1.2-1.6 lbs/ft$^3$, a permeability of about 5.0 CFM (as tested by ASTM D-3574 (G)), and a range of about 4.0-6.0 CFM, an indent, force deflection at 25% deflection (4 inch specimen) of about 14-20 lbs/50 in$^2$ (as tested by ASTM D 3574 (B1)), and a range of about 12-22 lbs/50 in$^2$, a resilience (min rebound) of 40% (as tested by ASTM D 3574 (H)), and a range of about 30%-60%, a support factor of about 1.85 (as measured by ASTM D 3574 ($X_3$)), and a range of about 1.65-2.05, a tensile strength of about 10 lbs/in$^2$ (as measured by ASTM D 3574 (E)), and a range of about 9-11 lbs/in$^2$, an elongation of about 150% (as measured by ASTM D 3574 (E)), and a range of about 135%-165%, a tear resistance of about 1.5 lbs/linear inch (as measured by ASTM D 3574 (F)), and a range of about 1.3-1.7 lbs/linear inch, and a compression set at 50% compression of about 10% (as measured ty ASTM D 3574 (D)), and a range of about 9%-11%.

In certain embodiments, the second section 170 may include an open-cell polyurethane foam including a density of about 1.35 lbs/ft$^3$ (as tested by ASTM D-3574 (A)), and a range of about 1.15-1.55 lbs/ft$^3$, a permeability of about 5.0 CFM (as tested by ASTM D-3574 (G)), and a range of about 4.0-6.0 CFM, an indent, force deflection at 25% deflection (4 inch specimen) of about 27-33 lbs/50 $in^2$ (as tested by ASTM D 3574 (B1)), and a range of about 24-36 lbs/50 $in^2$, a resilience (min rebound) of 45% (as tested by ASTM D 3574 (H)), and a range of about 35%-65%, a support factor of about 2.0 (as measured by ASTM D 3574 ($X_3$)), and a range of about 1.8-2.2, a tensile strength of about 12 lbs/$in^2$ (as measured by ASTM D 3574 (E)), and a range of about 11-13 lbs/$in^2$, an elongation of about 150% (as measured by ASTM D 3574 (E)), and a range of about 135%-165%, a tear resistance of about 1.25 lbs/linear inch (as measured by ASTM D 3574 (F)), and a range of about 1.1-1.4 lbs/linear inch, and a compression set at 50% compression of about 10% (as measured ty ASTM D 3574 (D)), and a range of about 9%-11%.

In certain embodiments, the values recited herein for density, permeability, resilience, support factor, tensile strength, elongation, and tear resistance are a minimum value measured anywhere in production test sample blocks. In other embodiments, the value for compression set is a maximum value measured anywhere in production test sample blocks.

Stated differently, in some embodiments, the second section 170 may be constructed/formed of a resilient material which is capable of being compressed, when under pressure, from an original configuration to a compressed state. Continuing from the above example, once the pressure is removed, the second section 170 may then return to its original configuration within some period of time. Moreover, in some embodiments, the second section 170 may be constructed/formed from an open cell foam that permits air to pass therethrough and thus into internal cavity 150.

In some embodiments, the body 100 of the prone pillow may include a first section 160 that may include a polymeric foam. In other embodiments, first section 160 may include a molded, resilient closed cell foam material. In some embodiments, the first section 160 may have a top surface 161 configured to be soft and comfortable and configured to be engaged with a patient's head, and specifically a patient's face. Although, in some embodiments, the first section 160 is resilient, it may not be as resilient as the second section 170. In certain embodiments, the second section 170, as discussed herein, may be generally more dense, robust, and resilient than the first section 160 because it is configured to provide most of the support for the head of patient. While the first section 160 is generally softer, less dense, and more cushioned to provide the most comfortable environment, particularly for the face of a patient.

In some embodiments, the first section 160 may include various densities depending on the type of surgical procedure being performed and the characteristics of the patient being operated upon. By way of non-limiting example, a heavier or bulkier patient may require the first section 160 to possess a higher density (i.e., higher compressive strength). In a further embodiment, the mass of first section 160 may be somewhat less than the mass of the second section 170 in order to provide improved stability to the overall body 100.

Figure 7:
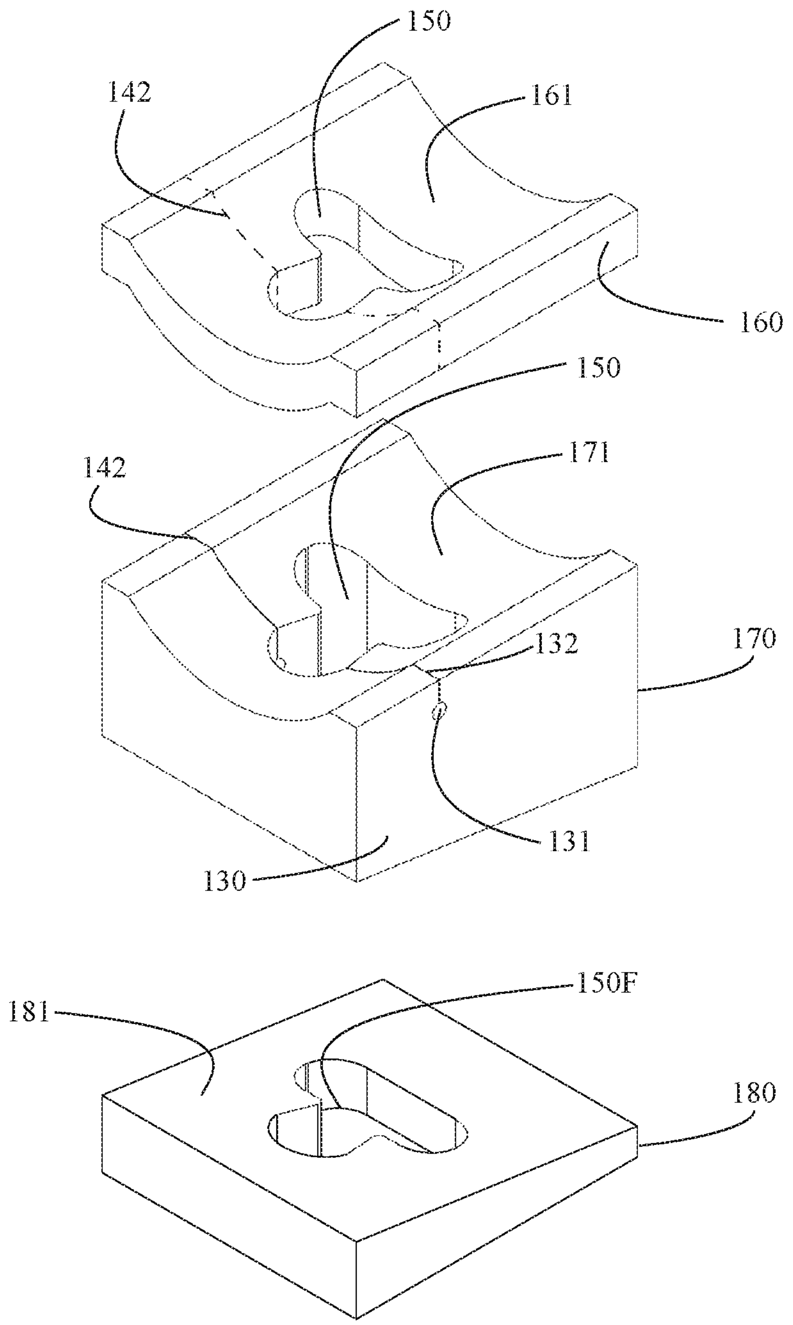
FIG. 7 is an exploded top perspective view of a prone pillow in accord with embodiments of the present disclosure.
Figure 8:
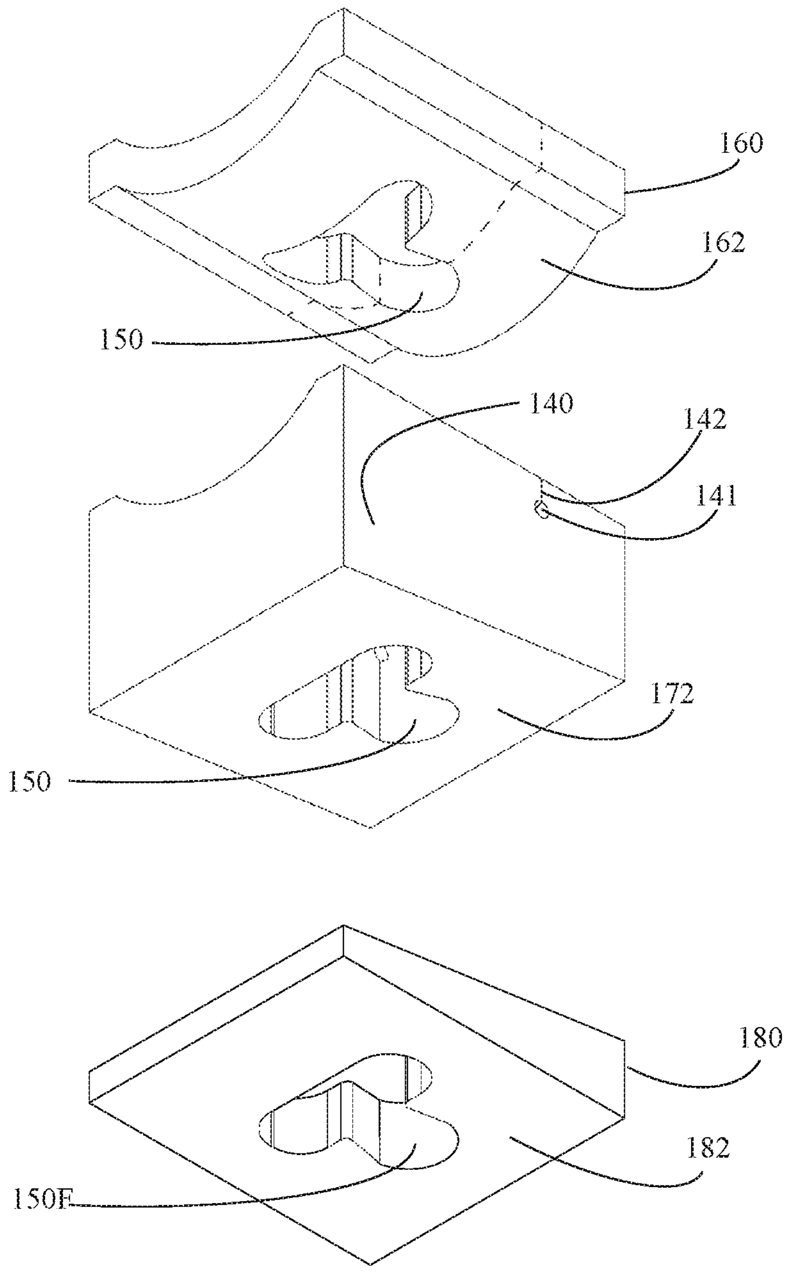
FIG. 8 is an exploded bottom perspective view of a prone pillow in accord with embodiments of the present disclosure.

Briefly referring to FIGS. 7 and 8 specifically, body 100 is shown in an exploded view where the first section 160, the second section 170, and a wedge pad 180, which is discussed in more detail herein, are shown separate from each other. In some embodiments, the first section 160 may have a bottom surface 162, as well as the top surface 161 (also shown as the top surface 110 in FIGS. 1-6). In another embodiment, the second section 170 may have a top surface 171 and a bottom surface 172. In yet a further embodiment, the wedge pad 180 may have a top surface 181 as well as a bottom surface 182 (also shown as the bottom surface 120 in FIGS. 1-6).

In certain embodiments, e.g. in FIGS. 1-8, the body 100 includes all three components (e.g., first section 160, second section 170, and wedge pad 180). In some embodiments, the body may only include the first and second sections. In an alternative embodiment, the body 100 may only include the first section 160 and the wedge pad 180. In yet a further embodiment, the body 100 may only include the second section 160 and the wedge pad 180. Thus, although the top surface 110 is shown as including the top surface 161 of the first section 160, it should be understood that top surface 110 refers to whatever the topmost surface of the body 100 is when the pillow is in use. It should also be understood that bottom surface 120 refers to whatever the bottommost surface of the body 100 is when the pillow is in use. Thus, in an embodiment in which only the first section 160 and the second section 170 are utilized, the top surface 110 will still be equivalent to the top surface 161 of the first section 160, but the bottom surface 120 would be equivalent to the bottom surface 172 of the second section 170, instead of the bottom surface 182 of the wedge pad 180.

Regardless of configuration and which sections are present in the body 100, in some embodiments, the body may further include a means for connecting two or more sections together, for example, first section 160 to second section 170, first section 160 to wedge pad 180, second section 170 to wedge pad 180, or first section 160 to second section 170 to wedge pad 180. In some embodiments, the means may include an adhesive layer (not shown) which may be constructed of any suitable material capable of bonding the two desired sections together. In some embodiments, the adhesive includes a permanent adhesive. In other embodiments, the adhesive includes a temporary adhesive, for example, a pressure-sensitive adhesive or "PSA." In some embodiments, an adhesive layer (not shown) may be placed such that it is recessed from edges (e.g., outer edges of body 100 or inner edges of internal cavity 150) of any of the sections, leaving a gap or groove circumferentially around the edges of the respective layer. By offsetting the adhesive, the patient will avoid contacting the adhesive layer, even if the resilient layers shift during use. In one embodiment, first section 160 is adhered to second section 170 by adhesive, and the wedge pad 180 is not adhered to either the first section 160 or second section 170, and is therefore removable.

In another embodiment, the means for connecting two or more section may be a fastener, including, for example, snap(s), hook and loop fastener(s), button(s), snap(s), magnet(s), latches, or any suitable method of mechanical coupling) (not shown) that removably connects one section to another. In yet a further embodiment, the means for connecting the two or more section may include one or more protrusions (e.g., raised areas) on the top 161/171/181 or bottom 162/172/182 surfaces with a corresponding recess on the adjacent surface to interlock. The one or more interlocking protrusion/recess pairs can then restrict the movement of the joined sections relative to each other by friction and/or mechanical interaction. In a further embodiment, the means for connecting the two or more sections may include connecting the two or more sections by perforations. For example, the body 100 may be formed from a single piece of foam and may include perforations between the two or more sections such that the sections are removable from one another.

Figure 9:
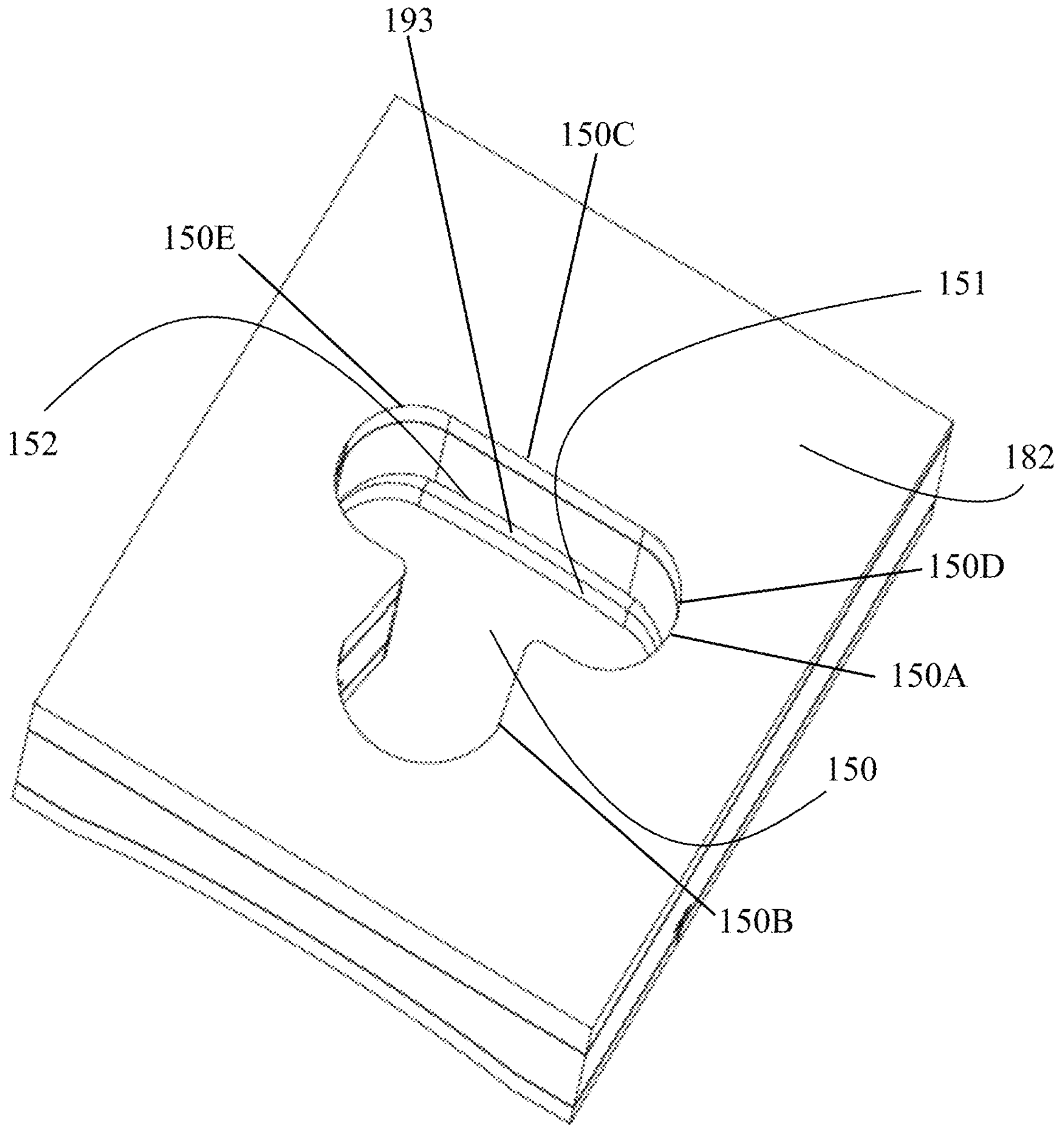
FIG. 9 is a bottom perspective view of a prone pillow detailing an overhang in accord with embodiments of the present disclosure

In some embodiments, and as shown in FIG. 9 an overhang 193 of the first section 160 may be present in the body 100, at or near a forehead edge 151 of the internal cavity 150. The forehead edge 151 is disposed at the forward surface 150C of the transverse portion 150A of internal cavity 150. Overhang 193 of the first section 160 may expand the entire length of forehead edge 151 and may include portions of the oppositely curved surfaces 150D, 150E. More specifically, in some embodiments, the opening for the internal cavity 150 in the first section 160 is smaller than the internal cavity 150 in the second section 170. In some embodiments, the overhang 193 may have a depth from the forehead edge 151 of about 0.1 inches or about 0.2 inches, or about 0.3 inches, or about 0.4 inches, and a range of about 0.15 inches-0.25 inches. In some embodiments, the overhang 193 may remain constant across the length of the edge. In a further embodiment, the overhang 193 may remain constant across the length of the edge until the rounding begins at the oppositely curved surfaces 150D, 150E at the bilateral sides of transverse portion 150A. In yet further embodiments, overhang 193 of the first section 160 may be present around the entire perimeter of the internal cavity 150.

In certain embodiments, first section 160 includes a softer material, and first section 160 overlaps with the firmer material of the second section 170. In other embodiments, this allows the softer material of the first section 160 to fold over a corner or edge 152 of the second section 170, configured such that a patient's face only contacts the softer material of the first section 160 as the patient's face deforms the first section 160 and second section 170. As discussed herein, the internal cavity 150 may have various sizes or shapes, and the body 100 may have different sizes or shapes. In some embodiments, forehead edge 151 may remain consistent across all size of internal cavities 150 and body 100 sizes. In alternative embodiments, the forehead edge 151 may vary based on the size of the internal cavity 150 and/or the body 100 size.

In embodiments where the top surface 110 is concave or cradled, the overall height of the body 100 may be reduced compared to an embodiment where the top surface 110 is flat Thus, to ensure that the incorporation of a concave feature does not compromise patient positioning, particularly the elevation of the head, in some embodiments, various body 100 heights may be available. By way of non-limiting example, in one embodiment, there may be a small body having a total height from the top-most point of the top surface 110 to the bottom surface 120 of about 8 inches and a support height i.e., the lowest point of the concave surface of the top surface 110 to the bottom surface 120 of about 6.5 inches, a medium body having a total height of about 8.5 inches and a support height of about 7 inches, and a large body having a total height of about 9 inches and a support height of about 7.5 inches. In embodiments, the concave shape of top surface 110 is configured to support a human face.

In certain embodiments, embodiments of the prone pillow may be used for a patient in an operating room ("OR"), for example, where a more angled surface is required, and in other embodiments, the prone pillow may be used for a patient in the intensive care unit ("ICU"), for example, where a more level surface is required.

Thus, in some embodiments, body 100 may include a wedge pad 180 that may have an angled surface 181 and a face or internal cavity 150. As used herein, "angled" will mean a non-horizontal slope, for example from a front edge to a back edge of a body 100 portion. Although the wedge pad 180 is shown with the top surface 181 being the angled surface, it should be understood that either surface of the wedge pad 180, top surface 181 or bottom surface 182, may have an angled surface. In some embodiments, the bottom surface 172 of the second section 170 may be angled, for example, upward (as shown) or downward, with respect to the top surface 110, causing the top surface to be angled when the body 100 is resting on a level surface with wedge pad 180 removed. For example, the angled surface 181 may cause the top surface 110 of the body 100 to be angled up, or lifting the forehead of the patent higher than the chin, as shown in FIG. 10B. In an alternative example, the angled surface may cause the top surface 110 of the body 100 to be angled down, or lifting the chin of the patent higher than the forehead.

In a further embodiment, the wedge pad 180 may have both surfaces 181 and 182 having an angled surface. Moreover, in some embodiments, the internal cavity 150F of the wedge pad 180 may have dimensions or sizing approximately equal to the internal cavity 150 of the body 100 sections, including first section 160 and second section 170. As discussed herein, in some embodiments, the wedge pad 180 is configured to be removably coupled to one or more other sections of the body using any of the securing methods disclosed herein.

Figure 10A:
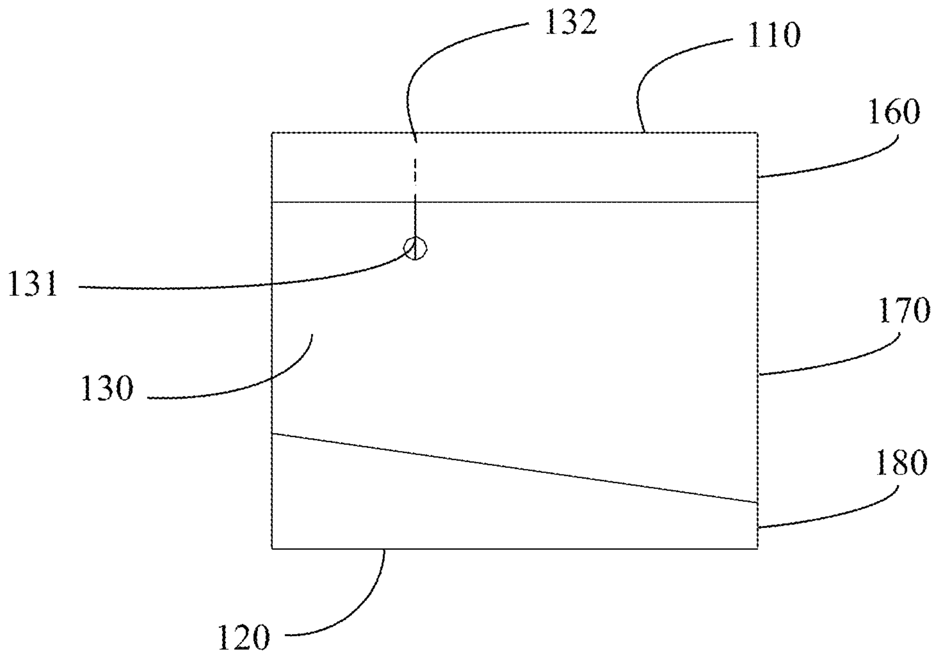
FIG. 10A is a side view of a prone pillow with a wedge pad in accord with embodiments of the present disclosure.
Figure 10B:
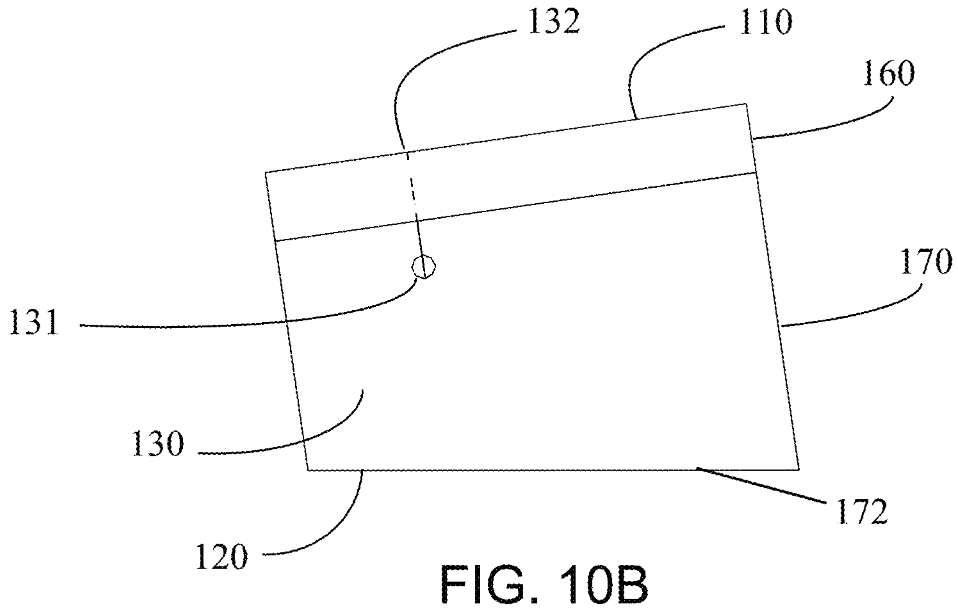
FIG. 10B is side view of a prone pillow without a wedge pad in accord with embodiments of the present disclosure

Furthermore, in some embodiments, and as shown in FIGS. 10A and 10B, the bottom surface 172 of the second section 170 may be angled (e.g., upward (as shown) or downward) with respect to the top surface 110. In one non-limiting example, and as shown, the top surface 110 of the body is angled up, or lifting the forehead of the patent higher than the chin, as shown in FIG. 10B) when the body is resting on a level surface. Accordingly, as shown in FIG. 10A, coupling the angled wedge pad 180 to the second section 170 may, in some embodiments, result in the top surface 110 becoming substantially level relative to the surface the body 100 is resting on. It should thus be understood that the presence or absence of wedge pad 180 may, in some embodiments, enable the top surface 110 to be at two or more different angles with respect to the surface that the body 100 is resting on, allowing the user to adjust the patient's head position, which in some embodiments thereby provides generally equal pressure distribution between forehead and chin.

In certain embodiments, the wedge pad 180 is not used in the OR, where clinicians have access to specialized equipment for patient positioning (i.e., chest pads, spinal frames, etc.). Specifically, in the OR, a head portion of an OR table may decline relative to the main table, or the patient may be positioned at an inclined angle, or the patient may be elevated on, for example, padding or pillows, and thus the angle of the top surface 110, without wedge pad 180, may be substantially level with respect to one of the floor, the main table, and/or the trunk of the patient, even if the surface that the pillow is resting on is not substantially level with respect to one of the floor, the main table, and/or the trunk of the patient. In other embodiments, the wedge pad 180 may be used in the ICU, where the head portion of an ICU table may be in the same plane as the main portion of the ICU table, which makes the top surface 110 substantially parallel to the top surface of the ICU table.

Although the FIGS. 1-8 show the bottom surface 172 of the second section 170 as angled, and thus insertion of the wedge pad 180 that is angled would cause the top surface 110 to become level or parallel with the supporting surface, it should be understood that alternative embodiments are considered herein. For example, in some embodiments, the bottom surface 172 of the second section 170 may be parallel to the top surface 110. Thus, in this example, insertion of the wedge pad 180 would cause the top surface 110 to become angled, for example, angled up, thereby lifting the forehead of the patent higher than the chin, or angled down, thereby lifting the chin of the patient higher than the forehead.

In a further embodiment, the wedge pad 180 may be used to modify the elevation of the prone pillow. As discussed herein, the prone pillow body 100 may have various sizes. Thus, when attempting to modify the overall height of the pillow body 100, various wedge pad 180 sizes may be required. Moreover, in some embodiments, depending on the medical environment, a patient head may need to be raised higher or lower than other embodiments. Accordingly, depending on the situation and environment, a specific wedge pad 180 (e.g., a wedge pad of a specific height/size) may be selected from a plurality of wedge pads 180 with various heights.

Figure 11:
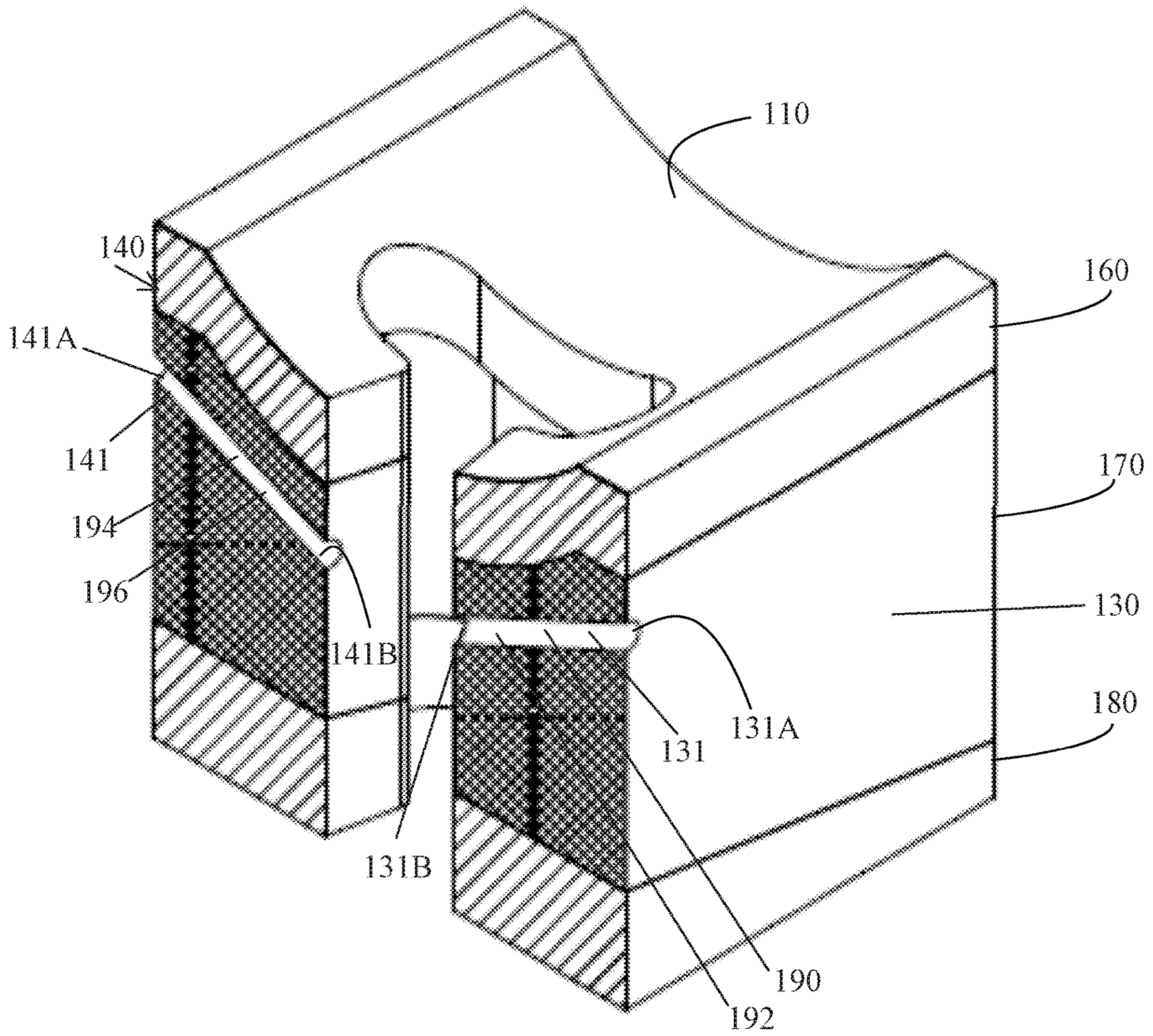
FIG. 11 is a cut-away top perspective view of a prone pillow in accord with embodiments of the present disclosure.

In some embodiments, and as shown in FIGS. 1-8 and detailed in FIG. 11, the prone pillow body 100 may include one or more intubation tube channels 131/141. Specifically, as shown, in some embodiments, a right-side intubation tube channel 131 may include a non-horizontal pathway 190, for example, a downward sloping pathway 192, upward sloping pathway, or a pathway that has both upward and downward sloping sections. In one embodiment, the non-horizontal pathway 190 extends in a downward angle from the right-side surface 130 to the internal cavity 150. In another embodiment, a left-side intubation tube channel 141 may be a non-horizontal pathway 194. In one embodiment, that non-horizontal pathway 194 may be a downward sloping pathway 196 extending in a downward angle from the left-side surface 140 to the internal cavity 150.

In a further embodiment, and as shown, the right-side 131 and left-side 141 intubation tube channels do not pass through the first section 160, and instead are wholly contained in the second section 170. However, in other embodiments, the right-side 131 and left-side 141 intubation tube channels do pass through the first section 160, the wedge pad 180, and/or any other section of the body 100. Moreover, in an alternative embodiment, the right-side 131 and left-side 141 intubation tube channels may be wholly contained in the first section 160, the wedge pad 180, and/or any other section of the body 100.

In still a further embodiment, the right-side 131 and left-side 141 intubation tube channels may have an angle that matches, or substantially matches, that of the concavity of concave surface 110C as it slopes from left and right flat edge surfaces 110A, 110B. In still a further embodiment, with reference to FIG. 11, the right-side 131 and left-side 141 intubation tube channels may have an angle that matches, or substantially matches, that of the concavity, where the angle is measured from the respective left and right flat edge surface 110A, 110B of the top surface 110, to the edge of the top surface 110 where it meets the internal cavity 150. In one embodiment, the right-side 131 and left-side 141 intubation tube channels may be angled at a consistent, or semi-consistent, pitch, for example, along a straight but angled path, which allows the initial opening 131A of intubation tube channel 131 on the right surface 130 and the initial opening 141A of intubation tube 141 on the left surface 140 to be higher than the respective right and left exit openings 131B, 141B to internal cavity 150 if the tube channels were not angled. Accordingly, the distance from the respective left and right flat edge surface 110A, 110B to intubation tube channels 131, 141 is the same as the distance between the concavity of concave surface 110C to intubation tube channels 131, 141, and the vertical distance between the intubation tube channels 131, 141 and the concave surface 110C is substantially constant. In one embodiment, the right-side 131 and left-side 141 intubation tube channels may be non-horizontal compared to the plane of top surface 110, or compared to the surface that the pillow is resting on. In an alternative embodiment, the right-side 131 and left-side 141 intubation tube channels may be curved, for example, curved up or down, instead of a straight line as they are depicted in FIG. 11.

Figure 3:
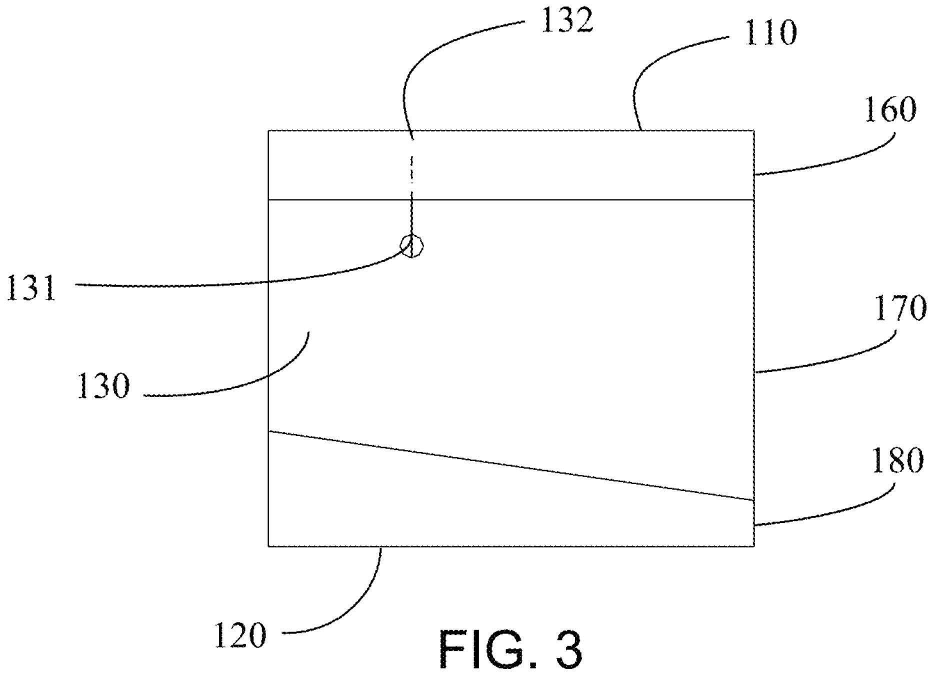
FIG. 3 is a side view of a prone pillow in accord with embodiments of the present disclosure.
Figure 4:
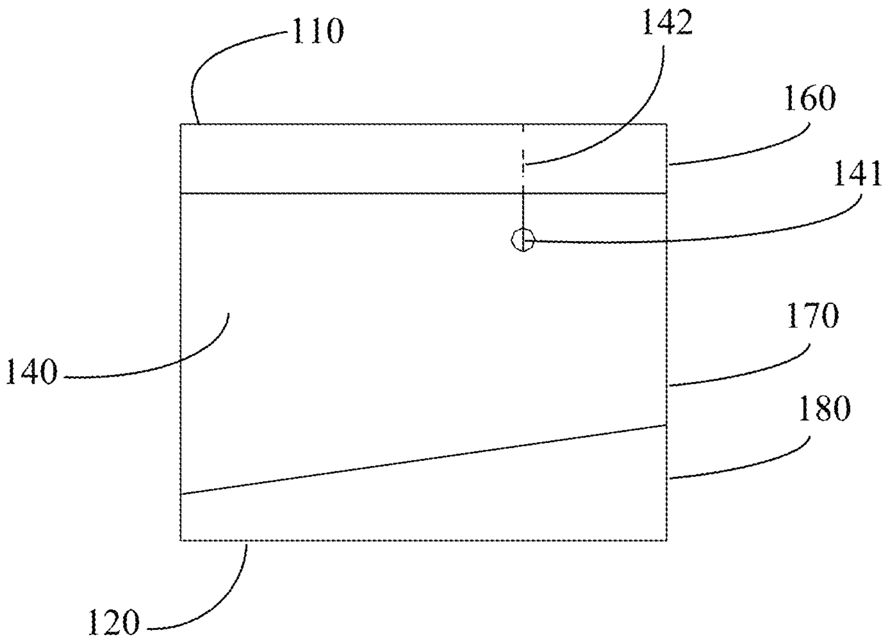
FIG. 4 is another side view of a prone pillow in accord with embodiments of the present disclosure.
Figure 5:
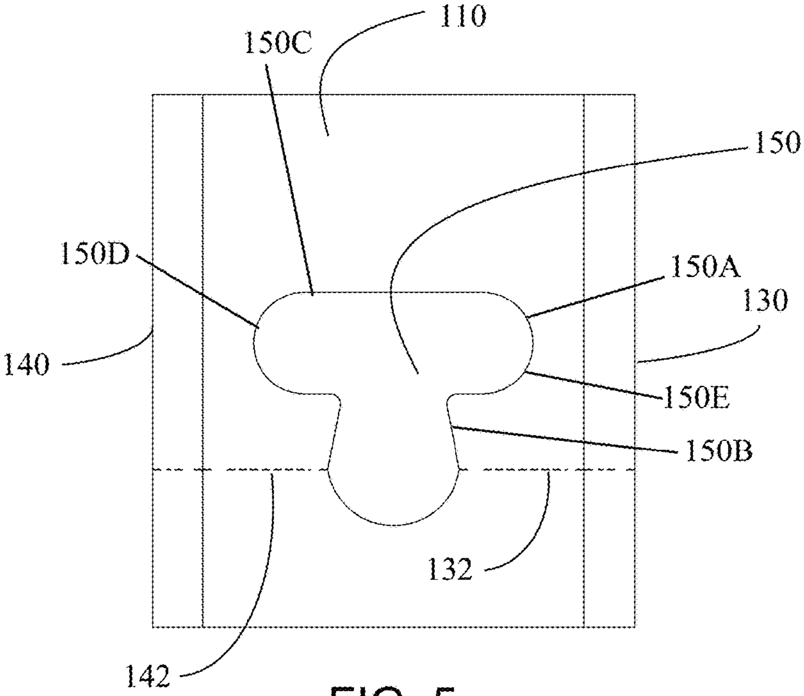
FIG. 5 is a top view of a prone pillow in accord with embodiments of the present disclosure.
Figure 6:
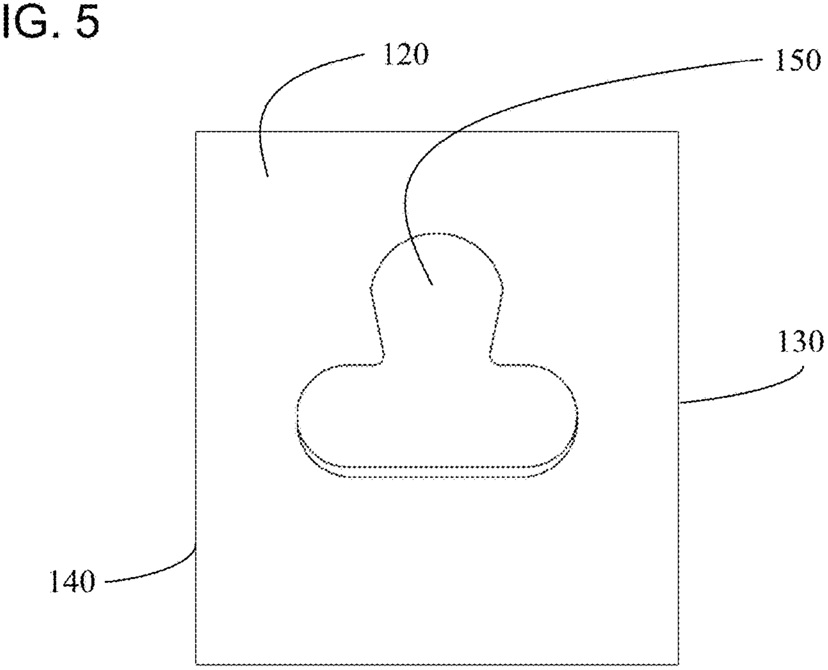
FIG. 6 is a bottom view of a prone pillow in accord with embodiments of the present disclosure.

In some embodiments, and as shown, the top surface 110 may include a compressible material configured to contact a head of a patient. In other embodiments, top surface 110 includes a right-side slot 132 configured to allow insertion of an intubation tube into the right-side intubation tube channel 131 and a left-side slot 142 configured to allow insertion of an intubation tube into the left-side intubation tube channel 141. In a further embodiment, and as shown in FIGS. 3 and 4, the right-side slot 132 and the left-side slot 142 start from the top surface 110 and pass through the body 100 until they reach the right-side intubation tube channel 131 and the left-side intubation tube channel 141, respectively. Accordingly, the right-side slot 132 and the left-side slot 142 bisect a portion of the body 100, and therefore first section 160 and second section 170, creating a passage having a first and second wall, or a lower wall nearer the chin of the patient and an upper wall nearer the forehead of the patient, respectively, that are closely adjacent, and in some embodiments, as discussed below, may still be touching or even partially connected to one another.

In some embodiments, and as shown in FIGS. 1-8, one or more sections, for example, first section 160, second section 170, and wedge portion 180, may have a set of bilateral intubation tube channels 131/141 that are accessible from the top surface 110 of the body 100 via the right-side slot 132 and left-side slot 142. Stated differently, some embodiments may include right-side slot 132 and left-side slot 142 that include a perforation pattern that allows medical professionals to selectively break the perforation on only the side they intend to use, thus ensuring that the unused side remains structurally intact. In one embodiment, one or both of right-side slot 132 and left-side slot 142 are perforated in one or more of the first section 160 and second section 170. In one embodiment, only the portion of the right-side slot 132 and left-side slot 142 that are included in first section 160 are perforated.

In some embodiments, the set of bilateral intubation tube channels 131/141 may meet the internal cavity 150 at a depth configured to correspond to at or below the corner of a mouth of a patient, allowing an intubation tube to enter the prone pillow from at or below the patient's mouth without requiring excessive bending or routing of the intubation tube, which could negatively impact the functionality of the intubation tube, for example, if it gets crimped, kinked, or crushed.

In certain embodiments, the top of bilateral intubation tube channels 131/141 where they intersect the internal cavity 150 has a depth D1 of about 2.5 inches from the top surface 110, and a range of about 2-3 inches. In certain embodiments, the top of bilateral intubation tube channels 131/141 where they intersect the corresponding right-side surface 130 and left-side surface 140 has a depth D2 of about 2.25 inches from the top surface 110, and a range of about 1.75-2.75 inches.

In certain embodiments, first section 160 is about 1.5 inches thick, and a range of about 1-3 inches. In other embodiments, D1 and D2 are configured to be at a depth that prevents first section 160 and second section 170 from materially separating and having a gap above the top of bilateral intubation tube channels 131/141, or in right-side slot 132 and left-side slot 142, when the patient's head is resting on the pillow. In some embodiments, the gap is less than 0.1 inches, less than 0.25 inches, less than 0.4 inches, less than 0.5 inches, less than 0.75 inches, less than 1 inches, less than 1.5 inches, and ranges of any in between.

In another embodiment, the bilateral intubation tube channels 131/141 may be routed far enough from the top surface 110 which may include a concave surface 110 C of the prone pillow to ensure that the intubation tubing will not be felt by the patient, even when the prone pillow is compressed, but low enough to leave the structure of the second section 170 largely intact and avoid the pillow splitting in half at right-side slot 132 and/or left-side slot 142, as discussed herein. In certain embodiments, during a medical procedure, one of more of the perforations of the right-side slot 132 or one or more perforation of the left-side slot 142 may be opened, while the other side of the perforation may remain sealed or intact (i.e., not torn). The structure of the second section 170 largely remains intact and avoids the pillow splitting in half at right-side slot 132 and/or left-side slot 142 because the bilateral intubation tube channels 131/141 are closer to the surface 110 than if the intubation tube channel 131/141 was not angled, or was angled up instead of down. This requires less of the second section 170 to hold itself together across the slot 132/142 than if the outside opening 131A, 141A were lower.

In certain embodiments, each slot (e.g., right-side slot 132 and left-side slot 142) may have a perforation pattern. Some non-limiting examples of perforations patterns may include, but are not limited to, only being perforated along the top surface 110, and the right-side slot 132 and left-side slot 142 being otherwise not connected. In other embodiments, right-side slot 132 and left-side slot 142 are only perforated directly along the top of the right-side 131 and left side 141 intubation tube channels, and left-side slot 142 being otherwise not connected. In still further embodiments, right-side slot 132 and left-side slot 142 are perforated all the way down from the top surface to the intubation tube channels, or perforated throughout the first section 160 but not second section 170, providing some level of connection along the entire depth of right-side slot 132 and left-side slot 142. Accordingly, in some embodiments, the first and second walls (not shown) of the right-side slot 132 and left-side slot 142, for example, a lower wall nearer the chin of the patient and an upper wall nearer the forehead of the patient, may be connected using perforations at any point vertically or horizontally between the first and second wall.

Accordingly, in some embodiments, the right-side channel 131 may include a right-side slot 132 having a right-side perforation pattern 132, wherein the right-side perforation pattern must be broken prior to insertion of the intubation tube in the right-side channel 131 via the right-side slot 132 though the top surface 110. In another embodiment, the left-side channel 141 may include a left-side slot 142 having a left-side perforation pattern 142, wherein the left-side perforation pattern must be broken prior to insertion of the intubation tube in the left-side channel 141 via the left-side slot 142 though the top surface 110.

Accordingly, various embodiments embodiment disclosed herein, allow use of the prone face pillow (for example, in the OR, ICU, or other) when the patient is already intubated. In other words, a patient can be intubated first, and then placed in the prone position on the pillow without removing the intubation tube. In one non-limiting example, a medical professional may determine the type of prone position required for the patient head (for example, angled or parallel) and select or create (for example, by combining first section 160, second section 170, and/or including the wedge pad 180) the appropriate pillow. Based on the location of various medical equipment (for example, a ventilator, etc.), the routing of tubing (for example, an intubation tube, endotracheal tube, or other), or other factors in the environment, a medical professional or surgical planning system/computer may then determine the preferred or optimal side of the pillow (for example, left or right) to insert the tubing.

Once a determination is made on which side the tube(s) will be routed, the perforations on either the right-side slot 132 or the left-side slot 142 are broken or ripped to allow access to the associated intubation tube channel 131/141. The face of the patient can then be positioned on the top surface 110 of the body 100 and the tube(s) inserted into the selected intubation tube channel 131/141 without having to disconnect the intubation tubing from the breathing circuit using the appropriate slot 132/142.

One embodiment may include the diameter for the right-side 131 and left-side 141 intubation tube channels sized to substantially accommodate the diameter of the intubation tube. In these embodiments, the intubation tube itself supports the surrounding intubation tube channel 131/141, and prevents such channel from collapsing under the weight of a patient. In a further embodiment, the right-side 131 and left-side 141 intubation tube channels may be an angled or non-horizontal pathway.

In a specific embodiment, the right-side 131 and left-side 141 intubation tube channels may have a diameter that is less than or equal to about 0.5 inches. In another embodiment, the right-side 131 and left-side 141 intubation tube channels may have a diameter that is less than or substantially equal to the diameter of the intubation tube. In certain embodiments, the right-side 131 and left-side 141 intubation tube channels may also be configured to allow for routing of an intubation tube more aligned with how the tube would route in the absence of a face pillow.

Applicable to any embodiments disclosed herein, the terms "upward" and "downward" are used for convenience in reference to the figures for explaining examples of motion, but are not meant to be limiting. In embodiments, the first section 160, second section 170 and wedge pad 180, and other components may move in any direction relative to each other, for example left and right, inward and outward, and the like. In embodiments, the first section 160, second section 170 and wedge pad 180 may move perpendicularly or otherwise angled relative to the any other section or other components of the body 100.

All of the features disclosed, claimed, and incorporated by reference herein, and all of the steps of any method or process so disclosed, may be combined in any combination, except combinations where at least some of such features and/or steps are mutually exclusive. Each feature disclosed in this specification may be replaced by alternative features serving the same, equivalent or similar purpose, unless expressly stated otherwise. Thus, unless expressly stated otherwise, each feature disclosed is an example only of a generic series of equivalent or similar features. Inventive aspects of this disclosure are not restricted to the details of the foregoing embodiments, but rather extend to any novel embodiment, or any novel combination of embodiments, of the features presented in this disclosure, and to any novel embodiment, or any novel combination of embodiments, of the steps of any method or process so disclosed.

Although specific examples have been illustrated and described herein, it will be appreciated by those of ordinary skill in the art that any arrangement calculated to achieve the same purpose could be substituted for the specific examples disclosed. This application is intended to cover adaptations or variations of the present subject matter. Therefore, it is intended that the invention be defined by the attached claims and their legal equivalents, as well as the illustrative aspects. The above-described embodiments are merely descriptive of its principles and are not to be considered limiting. Further modifications of the invention herein disclosed will occur to those skilled in the respective arts and all such modifications are deemed to be within the scope of the inventive aspects.

What is claimed is:

1. A prone face pillow, comprising:

a body comprising a top surface, a bottom surface, a right-side surface, a left-side surface, and an internal cavity being open at the top surface and the bottom surface;

a right-side intubation tube channel comprising a non-horizontal pathway from the right-side surface to the internal cavity;

a left-side intubation tube channel comprising a non-horizontal pathway from the left-side surface to the internal cavity;

the top surface comprising a compressible material configured to contact a head of a patient and comprising a right-side slot configured to allow insertion of an intubation tube into the right-side channel and a left-side slot configured to allow insertion of an intubation tube into the left-side channel;

the right-side channel comprising a right-side perforation pattern, wherein the right-side perforation pattern is configured to be broken prior to insertion of the intubation tube in the right-side channel from the top surface; and the left-side channel comprising a left-side perforation pattern, wherein the left-side perforation pattern is configured to be broken prior to insertion of the intubation tube in the left-side channel from the top surface.

2. The prone face pillow of claim 1, wherein the body further comprises:

a first section comprising the top surface; and a second section, the first section and second section being coupled together using at least one adhesive, and the first section comprising a softer material than the second section.

3. The prone face pillow of claim 2, wherein the second section comprises a material having a higher compressive strength than the first section.

4. The prone face pillow of claim 2, wherein a portion of the first section comprises an overhang that extends into the internal cavity further than the second section.

5. The prone face pillow of claim 2, wherein the right-side intubation tube channel and the left-side intubation tube channel do not pass through the first section.

6. The prone face pillow of claim 1, further comprising: a wedge pad comprising an angled surface and an internal cavity, the internal cavity of the wedge pad comprising dimensions approximately equal to the internal cavity of the body, wherein the angled surface of the wedge pad is configured to be removably coupled to the bottom surface of the body.

7. The prone face pillow of claim 1, wherein the bottom surface and the top surface are not parallel.

8. The prone face pillow of claim 1, wherein the top surface comprises a concave surface configured to cradle the head of the patient, wherein the non-horizontal pathways of the right-side intubation tube channel and the left-side intubation tube channel are configured so that a distance between the concave surface and the right-side intubation tube channel and the left-side intubation tube channel is substantially constant.

9. The prone face pillow of claim 1, wherein the right-side intubation tube channel and the left-side intubation tube channel each comprise a diameter of about 0.5 inches or less, wherein the right-side intubation tube channel comprises an initial opening at the right-side surface and an exit opening at the internal cavity, and the left-side intubation tube channel comprises an initial opening at the left-side surface and an exit opening at the internal cavity, wherein each initial opening is higher than a respective exit opening.

10. A prone face pillow, comprising:

a body comprising a top surface, a bottom surface, a right-side surface, a left-side surface, and an internal cavity being open at the top surface and the bottom surface;

a right-side intubation tube channel comprising a downward sloping pathway from the right-side surface to the internal cavity;

a left-side intubation tube channel comprising a downward sloping pathway from the left-side surface to the internal cavity;

the top surface comprising a compressible material configured to contact a head of a patient;

the right-side intubation tube channel comprising a sealed right-side slot configured to allow insertion of an intubation tube into the right-side channel;

the left-side intubation tube channel comprising a sealed left-side slot configured to allow insertion of an intubation tube into the left-side channel;

wherein the sealed right-side slot is configured such that the sealed right-side slot must be opened by a user prior to insertion of the intubation tube in the right-side channel; and wherein the sealed left-side slot is configured such that the sealed left-side slot must be opened by a user prior to insertion of the intubation tube in the left-side channel.

11. The prone face pillow of claim 10, wherein the body further comprises:

a first section comprising the top surface; and a second section comprising the bottom surface, the first section and second section being coupled together using at least one adhesive, and the first section comprising a softer material than the second section.

12. The prone face pillow of claim 11, wherein the second section comprises a material having a higher compressive strength than the first section.

13. The prone face pillow of claim 11, wherein a portion of the first section comprises an overhang that extends into the internal cavity further than the second section.

14. The prone face pillow of claim 11, wherein the right-side intubation tube channel and the left-side intubation tube channel do not pass through the first section.

15. The prone face pillow of claim 10, further comprising: a wedge pad comprising an angled surface and an internal cavity, the internal cavity of the wedge pad comprising dimensions approximately equal to the internal cavity of the body, wherein the angled surface of the wedge pad is configured to be removably coupled to the bottom surface of the body.

16. The prone face pillow of claim 10, wherein the bottom surface and the top surface are not parallel.

17. The prone face pillow of claim 10, wherein the top surface comprises a concave surface configured to cradle the head of the patient, wherein the non-horizontal downward sloping pathways of the right-side intubation tube channel and the left-side intubation tube channel are configured so that a distance between the concave surface and the right-side intubation tube channel and the left-side intubation tube channel is substantially constant.

18. The prone face pillow of claim 10, wherein the right-side intubation tube channel and the left-side intubation tube channel each comprise a diameter of about 0.5 inches or less, wherein the right-side intubation tube channel comprises an initial opening at the right-side surface and an exit opening at the internal cavity, and the left-side intubation tube channel comprises an initial opening at the left-side surface and an exit opening at the internal cavity, wherein each initial opening is higher than a respective exit opening.

19. A prone face pillow, comprising:

a first section and a second section coupled together using at least one adhesive to form a body, the body comprising a top surface, a bottom surface, a right-side surface, a left-side surface, and an internal cavity, wherein the second section comprises a material having a higher compressive strength than the first section;

the first section comprising an overhang that extends into the internal cavity further than the second section;

a right-side intubation tube channel comprising an angled pathway having a diameter of about 0.5 inches or less from the right-side surface to the internal cavity;

a left-side intubation tube channel comprising an angled pathway having a diameter of about 0.5 inches or less from the left-side surface to the internal cavity;

the top surface comprising a compressible material configured to contact a head of a patient and comprising a right-side slot configured to allow insertion of an intubation tube into the right-side channel and a left-side slot configured to allow insertion of an intubation tube into the left-side channel;

the right-side channel comprising a right-side perforation pattern, wherein the right-side perforation pattern is configured to be broken prior to insertion of the intubation tube in the right-side channel from the top surface; and the left-side channel comprising a left-side perforation pattern, wherein the left-side perforation pattern is configured to be broken prior to insertion of the intubation tube in the left-side channel from the top of the surface.

20. The prone face pillow of claim 19, further comprising: a wedge pad comprising an angled surface and an internal cavity, the internal cavity of the wedge pad comprising dimensions approximately equal to the internal cavity of the body, wherein the angled surface of the wedge pad is configured to be removably coupled to the bottom surface of the body.

* * * * *